Patented July 20, 1948

2,445,370

UNITED STATES PATENT OFFICE 2,445,370

CATALYTIC CRACKING OF HYDROCARBON OILS WITH ACTIVATED CLAYS

William E. Spicer and Jerry A. Pierce, Baton Rouge, La., assignors to Standard Oil Development Company, a corporation of Delaware No Drawing. Application August 19, 1943, Serial No. 499,232

2 Claims. (Cl. 196—52)

This invention relates to a process for activating clays and is concerned more particularly with the preparation of activated clay catalysts for the conversion of hydrocarbon oils.

It is commonly known that certain types of bentonite clays can be converted into active catalysts for hydrocarbon conversion, and particularly for catayltic cracking, by treatment with an inorganic acid such as sulfuric acid.

The general method of activation is to digest the clay with an acid for a prolonged period followed by washing and drying the treated product.

We have found that particularly active catalysts for cracking oils may be prepared by effecting the acid treatment in two or more successive stages. The clay may be filtered and washed between the stages or the additional acid may be added at intervals without intermediate washing treatment.

The total amount of acid used during the entire treatment should be equal to at least one-half of the weight of the clay and should preferably be somewhat higher, such as between 60% and 80% of the clay. The concentration of the acid employed is preferably below 25%. Particularly good results are obtained by employing acid having a concentration of about 12.5%.

The following examples serve to illustrate the advantages which may be obtained by successive stage treating according to the present invention as compared with those obtained in a single stage according to the usual practice.

The term "dosage" as employed in the following examples means the actual weight per cent of undiluted anhydrous acid based on the weight of dry clay treated as distinguished from "concentration" of the acid.

Example 1

A bentonite clay from Mississippi and designated as "Chisholm bentonite" was treated at a temperature of 175° F. to 200° F. for a six-hour period with sulfuric acid having a concentration of 12.5%. The total amount of 100% acid employed in this treatment was 35% by weight of the clay as dry substance. The clay slurry at the end of the treatment was filtered and washed practically free of sulfuric acid. An amount of acid and sufficient water were added to the filter cake to produce a slurry identical to the first. Heat treatment was continued for another six hours. The resulting product was then washed free of sulfate ion, dried and made into pellets. The activity of the pellets was then determined by passing an East Texas gas oil in contact with the pellets at a temperature of 850° F., a space velocity of 0.6 volume of liquid feed per volume of catalyst per hour, for a two-hour period. The overhead vapors from the cracking treatment were condensed and redistilled.

Under the above conditions, 52% of gasoline boiling below 400° F. was produced from the oil.

Example 2

Another batch of catalyst was prepared by treating the same type of clay with a 25% dosage of sulfuric acid having a concentration of 12.5%. However, instead of treating twice for six hours as in Example 1, the clay was treated during three five-hour intervals with careful filtration and washing between each treatment. When the catalyst was finally washed and dried, it was pelleted and tested under the above conditions. A yield of about 52.5 volume per cent of material boiling below 400° F. was obtained.

Example 3

The clay of the type described in Example 1 was treated with an 80% dosage of sulfuric acid having a concentration of 12.5%. Half of the acid (40% dosage) was added at the beginning of the treatment. After five hours of treatment at 175°–200° F., the material was filtered and washed practically free of sulfate ion. The remaining acid and sufficient water were then mixed with the filter cake, and the treatment was reepated. This doubly treated material was then filtered, thoroughly washed, dried, and pelleted, and tested for activity under the conditions described in Example 1. It was found to produce about 52.5% of liquid hydrocarbons boiling below 400° F.

Example 4

A clay of the same type as described in Example 1 was treated with a single 75% dosage of sulfuric acid having a concentration of 12.5%. The single stage treating as carried out in this example, when tested to determine the cracking activity as above described, was found to produce 48.5% of liquid hydrocarbons boiling below 400° F.

By comparing Example 4 with the preceding examples, it will be noted that substantially higher conversions may be obtained by carrying out the acid treatment in successive stages.

Having described the preferred embodiment, it will be understood that the invention embraces such other variations and modifications as come within the scope of the accompanying claims.

What is desired to be protected by Letters Patent is:

1. A process for cracking hydrocarbon oils which comprises passing the oil to be cracked through a cracking zone containing a catalyst consisting essentially of a bentonite clay activated by first digesting said clay with a dilute solution of a mineral acid having a concentration below 25%, thereafter separating the clay from the acid solution, again digesting the clay with a fresh dilute solution of the same mineral acid, the total amount of 100% acid used being at least 50% of the weight of the clay, and the amount of 100% acid used in each digesting treatment being at least 25% by weight of the clay, thereafter washing and drying the resulting product, and keeping the oil in contact with said catalyst for a period sufficient to convert a substantial portion into lower boiling hydrocarbons.

2. A process for cracking hydrocarbon oils which comprises passing the oil to be cracked through a cracking zone containing a catalyst consisting essentially of a bentonite clay activated by first digesting said clay with a dilute solution of sulfuric acid having a concentration below 25%, thereafter separating the clay from said acid solution, again digesting the clay so separated with a fresh dilute solution of sulfuric acid having a concentration below 25%, the total amount of 100% sulfuric acid being at least 50% of the weight of the clay, and the amount of 100% acid used in each digesting treatment being at least 25% by weight of the clay, thereafter washing and drying the treated product to form the final catalyst, and keeping said oil in contact with said catalyst for a period sufficient to convert a substantial portion thereof into lower boiling hydrocarbons.

WILLIAM E. SPICER.
JERRY A. PIERCE.

REFERENCES CITED

The following references are of record in the file of this patent:

UNITED STATES PATENTS

| Number | Name | Date |
|---|---|---|
| 1,818,453 | Baylis | Aug. 11, 1931 |
| 1,913,960 | Roll | June 13, 1933 |
| 1,926,148 | Huber I. | Sept. 12, 1933 |
| 1,929,113 | Haseman | Oct. 3, 1933 |
| 1,976,127 | Huber II. | Oct. 9, 1934 |
| 2,206,055 | Shankland | July 2, 1940 |
| 2,271,148 | Becker et al. | Jan. 2, 1942 |
| 2,307,795 | Kearby | Jan. 12, 1943 |
| 2,319,590 | Eastman et al. | May 18, 1943 |
| 2,330,685 | Connolly | Sept. 28, 1943 |
| 2,372,018 | Ruthruff | Mar. 20, 1945 |
| 2,387,309 | Sweeney | Oct. 23, 1945 |
| 2,390,556 | Ruthruff | Dec. 11, 1945 |
| 2,410,436 | Ewing | Nov. 5, 1946 |

FOREIGN PATENTS

| Number | Country | Date |
|---|---|---|
| 490,853 | Great Britain | Aug. 23, 1938 |